US009122460B2

(12) United States Patent
Williamson

(10) Patent No.: US 9,122,460 B2
(45) Date of Patent: Sep. 1, 2015

(54) APPLICATION DEVELOPMENT USING MIDDLEWARE PLATFORM

(75) Inventor: Eric Williamson, Holly Springs, NC (US)

(73) Assignee: Red Hat, Inc., Raleigh, NC (US)

(\*) Notice: Subject to any disclaimer, the term of this patent is extended or adjusted under 35 U.S.C. 154(b) by 1271 days.

(21) Appl. No.: 12/200,374

(22) Filed: Aug. 28, 2008

(65) Prior Publication Data

US 2010/0058290 A1    Mar. 4, 2010

(51) Int. Cl.
*G06F 9/44* (2006.01)

(52) U.S. Cl.
CPC .......................... *G06F 8/20* (2013.01)

(58) Field of Classification Search
CPC ............... G06F 8/20; G06F 8/30; G06F 8/36; G06F 8/10; G06F 8/34
See application file for complete search history.

(56) References Cited

U.S. PATENT DOCUMENTS

| 7,539,957 B1* | 5/2009 | Nagarandal .................. 716/136 |
| 2005/0108685 A1* | 5/2005 | Ta ................................. 717/120 |
| 2008/0052690 A1* | 2/2008 | Bharadwaj .................... 717/140 |
| 2008/0065993 A1* | 3/2008 | Huang .......................... 715/745 |
| 2008/0270162 A1* | 10/2008 | Machacek ........................ 705/1 |
| 2008/0282231 A1* | 11/2008 | R et al. .......................... 717/127 |

\* cited by examiner

*Primary Examiner* — Li B Zhen
*Assistant Examiner* — Bradford Wheaton
(74) *Attorney, Agent, or Firm* — Lowenstein Sandler LLP

(57) ABSTRACT

Embodiments relate to systems and methods for application development using middleware. A developer can launch a development request from a client or local network to a remote development server, thereby invoking a set of frameworks and other tools to carry out a desired application build. The development request can specify the type or configuration of the desired application, such as, for example, email, spreadsheet, media playback, or other applications, along with parameters such as target operating systems. The user can assemble desired code from libraries stored in the virtualized middleware framework, and debug the application build against a set of data sources aggregated by the development server. A developer can therefore leverage rapid application development tools at the middleware, without a necessity to invest in local development tools or separately build or locate test data sources.

24 Claims, 4 Drawing Sheets

APPLICATION DEVELOPMENT USING MIDDLEWARE PLATFORM

FIELD

The present teachings relate to systems and methods for application development using a middleware platform, and more particularly to platforms and techniques for the rapid building of new software using virtualized development at the middleware.

BACKGROUND OF RELATED ART

Software development platforms exist for various application types and various operating environments. For example, rapid application development (RAD) packages exist for Web application frameworks and other environments, in which common or typical functional modules can be incorporated from code libraries into software prototypes, to allow a designer to assemble a desired larger software system without having to do original coding.

Existing software development platforms for the desktop or a local network entail certain drawbacks for the developer community, however. For one, it may represent a significant investment in expense, time, and training for a developer to acquire the various RAD or other development tools necessary to carry out an intended software build. Further, once a software prototype is built, developers typically wish to exercise or validate the build against a suite of test data, but installing reliable data sources to carry out debugging and validation may likewise represent a burdensome task. It may be desirable to provide methods and systems for application development that avoid the limitations and reduce the costs and complexities of traditional software development platforms.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for application development using middleware. More particularly, embodiments relate to platforms and techniques to design, implement and validate software applications using rapid development techniques at the middleware level of a network environment. In embodiments, a development server located at the middleware can receive a development request to initiate or continue a development project from a client machine or local network. The development request can contain parameters to specify that type of software to be built and validated. For example, the development request can specify that a word processing, email, messaging, database, or other software or application is desired to be tested and built. The development request can likewise specify parameters such as the intended operating system or Web browsing environment for the intended application. The development request can further indicate a desired validation data set to be used to verify the reliable operation of the software after completion of a build. It may be noted that in embodiments, the application build can take place and execute as a process hosted on the development server, rather than the client machine or local network making the development request. The requesting client or network therefore need not maintain or configure a separate set of application development tools, but instead can rely upon the virtualized development resources provided by the development server to carry out development projects. In addition, the requesting client or network can also rely upon access to sets of test data that are aggregated by the development server at the middleware, and therefore test the application against a comparatively wide array of data types and configurations. These and other embodiments described herein address the various noted shortcomings in known application development technology, and provide a user or network operator with enhanced capabilities for rapid and robust application development using virtualized resources.

Reference will now be made in detail to exemplary embodiments of the present teachings, which are illustrated in the accompanying drawings. Where possible the same reference numbers will be used throughout the drawings to refer to the same or like parts.

Figure 1:
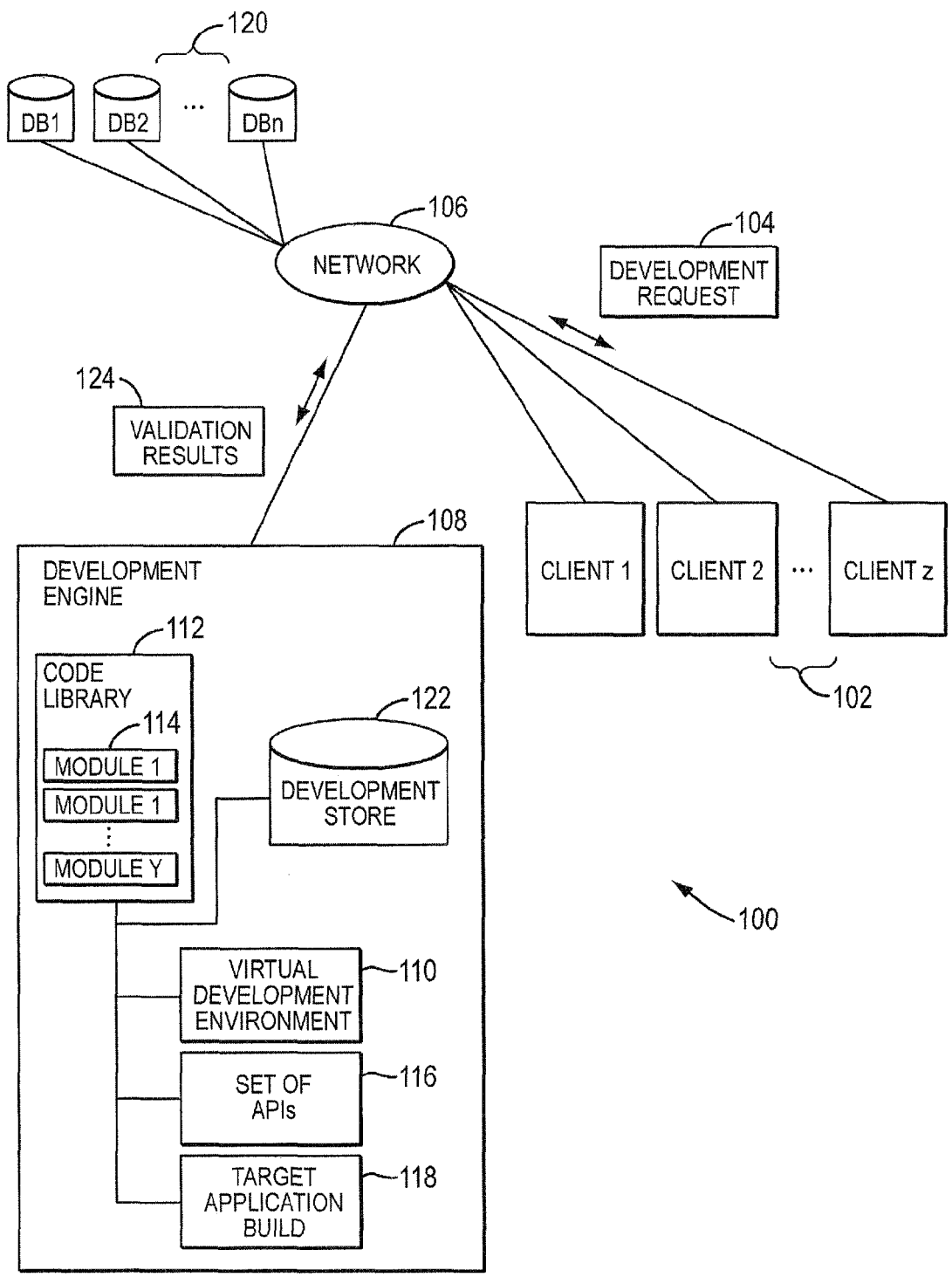
FIG. 1 illustrates an overall system for application development using middleware, according to various embodiments.

FIG. 1 illustrates an overall system 100 consistent with systems and methods for application development using middleware, according to various embodiments of the present teachings. In embodiments as shown, a set of clients 102 such as personal computers, workstations, or other clients, computers, or devices can communicate with a development engine 108 via one or more networks 106. One or more networks 106 can be or include the Internet, or other public or private networks. In general a developer or other user(s) can operate one or more client in set of clients 102 to initiate, carry out and complete a software development cycle to generate a target application build 118.

In embodiments as shown, a requesting client in set of clients 102 can communicate a development request 104 to development engine 108 to initiate development processing. Development request 104 can be or include the specifications for the desired application type of the intended development project, such as a word processing application, a media playback application, an email application, a messaging application, a database application, a spreadsheet application, a network security application, or other application, utility, module, or other software. In embodiments, the development request 104 can also specify other parameters associated with the intended development project, such as the target operating system or other environment, the target network environment, or other specifications, settings, configurations or features.

Upon receipt of development request 104, development engine 108 can invoke a virtual development environment 110 through which the user of the requesting client can initiate, configure, manage, maintain, and complete the development process for target application build 118. In embodiments, virtual development environment 110 can be hosted in development engine 108 at the level of middleware, and communicated to the requesting client in set of clients 102 via XML (extensible markup language), or other languages, channels, or protocols. In embodiments, virtual development environment 110 can contain resources to allow the user of the requesting client to design, build, test, configure and deliver a target application build 118 according to the supplied design specifications. Virtual development environment 110 can provide, for example, a code library 112 containing a set of modules 114 for the rapid and convenient of common or typical functions into target application build 118. The set of modules 114 can, for instance, contain modules such as a print module, a user interface or gadget module, a storage module, a networking module, a security module, and other modules, routines, functions, or other software modules or components. In embodiments, code library 112 can likewise contain or access a set of application programming interfaces (APIs) 116, such as programming interfaces to permit target application build 118 to access network connections, initiate or manage a graphical user interface, or perform or access other tasks. In embodiments, the user at the requesting client in set of clients 102 can select, install, and configure application resources including selected APIs, selected code modules, and other software components to assemble an initial or modified target application build 118 via development engine 108 at the middleware.

Once an initial version of target application build 118 is prepared, the user at the requesting client can remotely execute validation testing of the target application build via development engine 108. In embodiments, the user can select or development engine 108 can access one or more data sources in a set of test data sources 120 to exercise, test and confirm the stable operation of target application build 118 against a variety of input types, configurations, and sizes. After a validation run of target application build 118 against set of test data sources 120 is conducted, a set of validation results 124 can be returned via development engine 108 indicating the results of that testing. For instance, set of validation results 124 can contain indications of valid output and/or any fault conditions, program failures or faults, or other execution states of target application build 118 using the selected test data. Validation results 124 can be communicated to the requesting client in set of clients 102, and further updating, modification, patching, or other manipulation of target application build 118 via virtual application environment 110 and development engine 108 can be performed.

Figure 2:
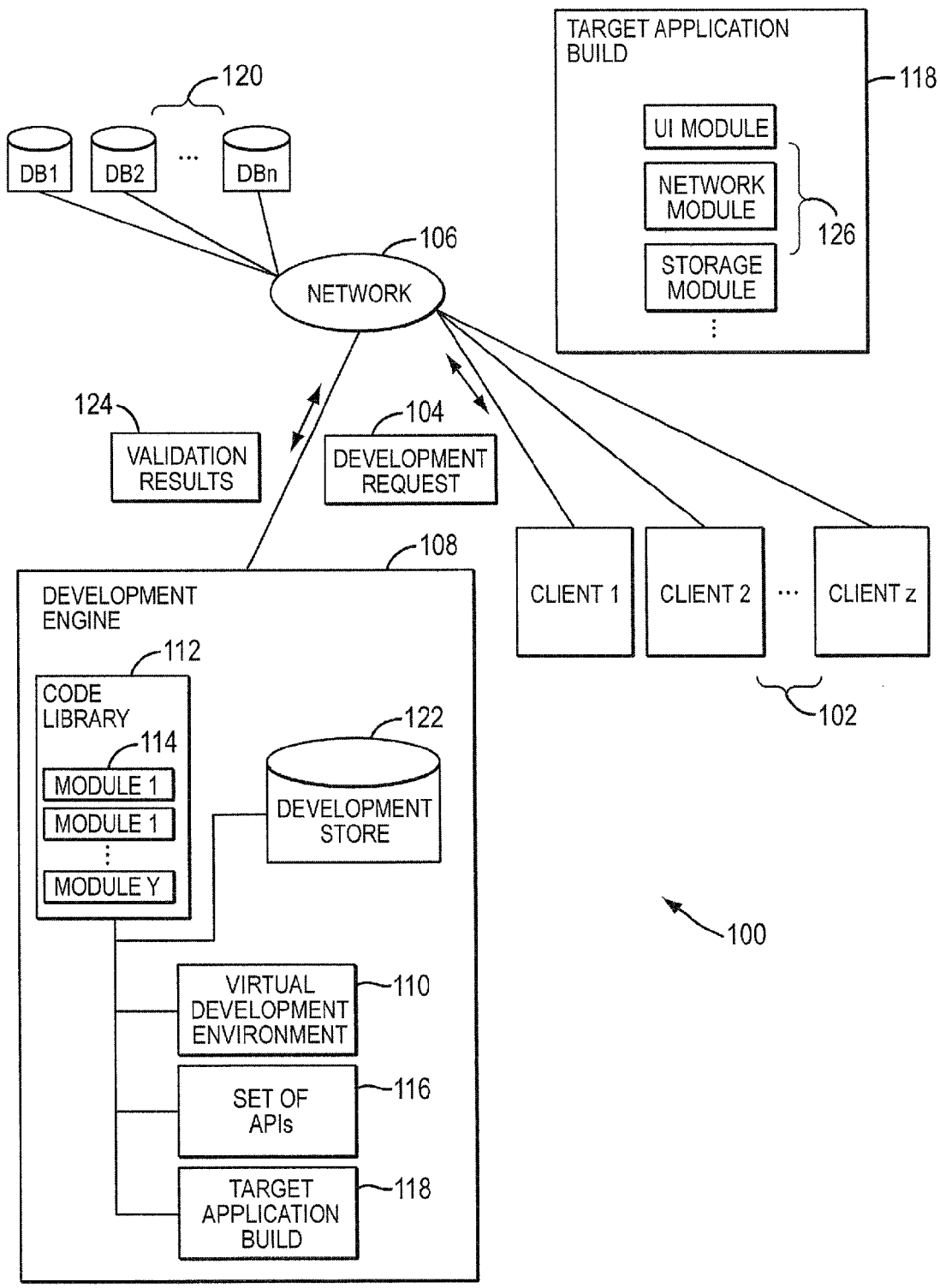
FIG. 2 illustrates an overall system for application development using middleware, according to various embodiments in further regards.

As shown in FIG. 2, once completed, target application build 118 can be configured with set of application modules 126 as built, tested, and validated according to the specifications in development request 104. In embodiments, a copy or image of the completed target application build 118 can be stored to development store 122, to the requesting client in set of clients, or to other locations or storage. For example, in embodiments the requesting client can distribute the completed target application build 118 to the remaining clients in set of clients 102 to perform a network-wide installation of the completed software. In embodiments, target application build 118 can be stored in development store 122 and/or other storage to permit further modification, updating, debugging, or other development processing. In embodiments, development engine 108 or other site or resource can provide an update service to the set of installed application via one or more networks 106, or otherwise, to download further updates or patches to the eventual target application build 118 and set of application modules 126, as desired.

Figure 3:
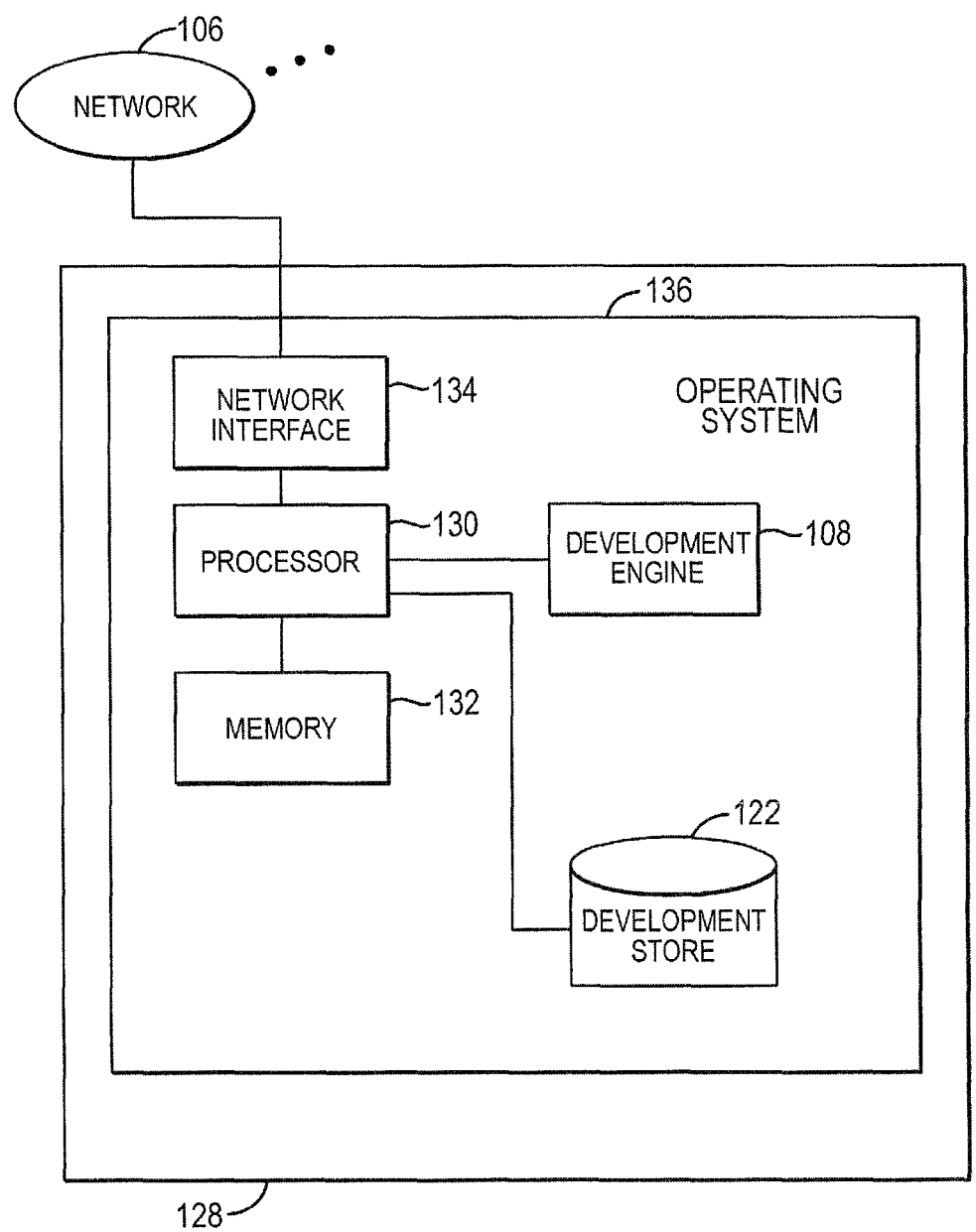
FIG. 3 illustrates an exemplary hardware configuration of a development server that can be used in systems and methods for application development using middleware, according to various embodiments.

FIG. 3 illustrates an exemplary diagram of hardware and other resources that can be incorporated in a host system 128 configured to support, host, execute or constitute development engine 108, according to embodiments. In embodiments as shown, host system 128 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with development store 122, such as a database stored on a local hard drive. Processor 130 further communicates with network interface 134, such as an Ethernet or wireless data connection, which in turn communicates with one or more networks 106, such as the Internet or other public or private networks. Processor 130 also communicates with development engine 108, to execute control logic and control the operation of assembling target application build 118 in virtual development environment 110. Other configurations of host system 128, associated network connections, and other hardware and software resources are possible.

Figure 4:
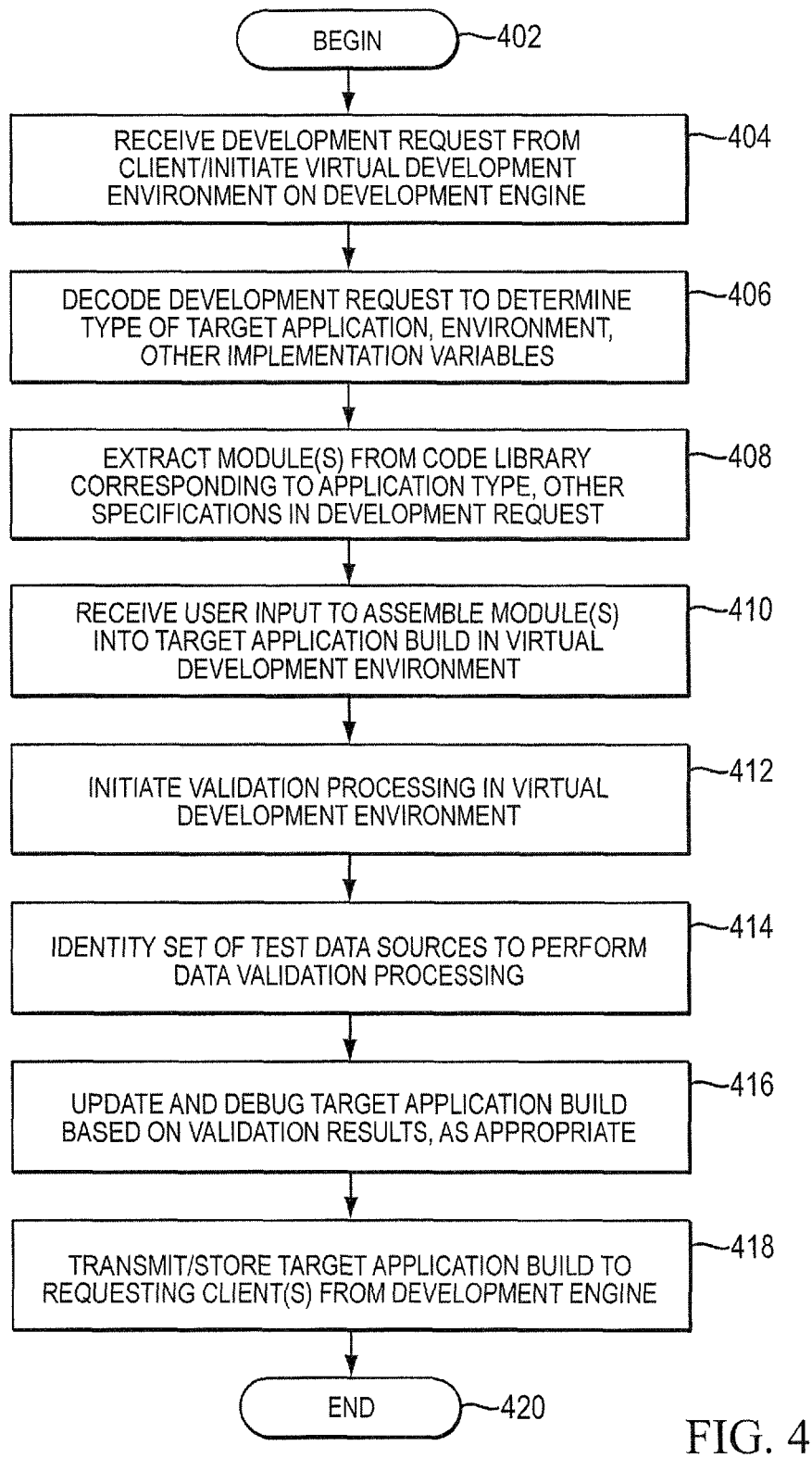
FIG. 4 illustrates a flowchart of overall application development processing using middleware, according to various embodiments.

FIG. 4 illustrates overall processing for application development using a middleware platform, according to embodiments. In 402, processing can begin. In 404, a development request 104 can be received from set of clients 102 in development engine 108. The development request 104 can be or include a request to initiate the development process for a target application build 118. In 406, the development engine 108 can decode the development request 104 to determine a type of the target application build 118 (e.g., a media playback application), the desired operating environment (e.g., Linux™ operating system) for the completed target application build 118, and other implementation parameters or variables. In 408, one or more modules can be extracted from the set of modules 114 stored in code library 112 which correspond to the application requirements and specifications contained in development request 104.

In 410, user selections or other input from the user of a client in set of clients 102 can be received to assemble selected module(s) in set of modules 114 into target application built 118 in virtual development environment 110 hosted by development engine 108. In 412, validation processing can be initiated in virtual development environment 110, for example by identifying computational tests, tests to exercise communications ports, compatibility tests, user interface tests, or other tests or exercises to determine the operability and/or reliability of target application build 118. In 414, a set of test data sources 120 can be identified by development engine 108 and/or the user with which to validate or exercise target application build 118 with desired data sets, such as, for example, databases having specified data types, spreadsheet data, encoded media such as video or audio files, financial data, or other data that can be used to provide input to target application build 118. In 416, the target application build 118 can be updated and debugged based on results of the validation testing performed on set of test data sources 120, or otherwise. For example, one or more code modules in set of code modules 114 selected from code library 112 to generate target application build 118 can be updated, modified or substituted. In 418, target application build 118 can be transmitted and/or stored to the requesting client in set of clients 102 from development engine 108. In embodiments, development engine 108 can in addition or instead store target application build in development store 122. In 420, processing can repeat, return to a prior processing point, jump to a further processing point, or end.

The foregoing description is illustrative, and variations in configuration and implementation may occur to persons skilled in the art. For example, while embodiments have been described in which a client* communicates with a single development server* located in the network at the middleware level, in embodiments, multiple servers can cooperate to provide code libraries, programming interfaces, debugging tools, sets of test data, and other resources required to carry out a development request. For further example, while embodiments have been described in which a development request is made to generate one application build, in embodiments, two or more applications can be specified and built together or in tandem, and can, for instance, be tested together for interoperability and other purposes. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   receiving, by a middleware development engine executable by a processor, a development request message comprising a specification of an application type, a specification of a target operating system, a specification of operating parameters, and a validation data set;
   generating, by the middleware development engine, a virtual development environment in view of the specification of the application type, the target operating system, and the operating parameters, the virtual development environment comprising a code library selectable to generate a target application build;
   validating, by the middleware development engine in the virtual development environment, the target application build with the validation data set to determine operability and compatibility of the target application build on the target operating system with the operating parameters, resulting in a validation result;
   selecting, by the processor, a set of test data sources from one or more sets of test data sources using the specification of the application type and the target application build;
   testing, by the middleware development engine in the virtual development environment, the target application build using the set of test data sources, resulting in a testing result; and
   generating, by the middleware development engine, an updated target application build, comprising updating a code module in the code library that is within the target application build using the validation result and the testing result.

2. The method of claim 1, wherein the development request message comprises a specification of a target operating environment.

3. The method of claim 1, wherein the middleware development engine comprises a middleware development engine hosted in a server.

4. The method of claim 1, wherein the virtual development environment comprises a set of validation options to validate operation of the target application build.

5. The method of claim 4, wherein the set of validation options comprises a set of test data sources.

6. The method of claim 1, wherein the validation result comprises one of an indication of valid output, a fault condition, a program failure, a program fault, or an execution state of the target application build.

7. The method of claim 1, further comprising:
   storing the target application build to a client or to a storage associated with the middleware development engine; and
   debugging the target application build using the testing result and the validation result.

8. A system comprising:
   a network interface;
   a memory; and
   a processor communicatively coupled to the memory, the processor to:
      communicate with the network interface, and
      execute a middleware development engine,
   the middleware development engine to:
      receive a development request message comprising a specification of an application type, a specification of a target operating system, a specification of operating parameters, and a validation data set,
      generate a virtual development environment in view of the specification of the application type, the target operating system, and the operating parameters, the virtual development environment comprising a code library selectable to generate a target application build,
      validate the target application build with the validation data set to determine operability and compatibility of the target application build on the target operating system with the operating parameters, resulting in a validation result;
      select a set of test data sources from one or more sets of test data sources using the specification of the application type and the target application build,
      test, in the virtual development environment, the target application build using the set of test data sources, resulting in a testing result, and
      generate an updated target application build using the validation result by updating a code module in the code library using the validation result and testing result.

9. The system of claim 8, wherein the development request message comprises a specification of a target operating environment.

10. The system of claim 8, wherein the middleware development engine comprises a middleware development engine hosted on a server.

11. The system of claim 8, wherein the virtual development environment comprises a set of validation options to validate an operation of the target application build.

12. The system of claim 11, wherein the set of validation options comprises a set of test data sources.

13. The system of claim 11, the middleware development engine further to generate an updated target application build using results of validation operations.

14. The system of claim 8, the middleware development engine further to:
   store the target application build to a client or to a storage associated with the middleware development engine; and
   debug the target application build using the testing and the validation results.

15. A non-transitory computer readable storage medium comprising data that, when executed by a processor, causes the processor to:
   receive, by a middleware development engine executable by the processor, a development request message comprising a specification of an application type, a specification of a target operating system, a specification of operating parameters, and a validation data set;
   generate a virtual development environment in the middleware development engine in view of the specification of the application type and in view of the specification of the target operating system, the virtual development environment comprising a code library selectable to generate a target application build;

validate, by the middleware development engine in the virtual development environment, the target application build with the validation data set to determine operability and compatibility of the target application build on the target operating system with the operating parameters, resulting in a validation result;

select, by the processor, a set of test data sources from one or more sets of test data sources using the specification of the application type and the target application build;

test, by the middleware development engine in the virtual development environment, a test of the target application build using the set of test data sources, resulting in a testing result; and generate, by the middleware development engine, an updated target application build, comprising updating a code module in the code library that is within the target application build using the validation result and testing result.

16. The non-transitory computer readable storage medium of claim 15, wherein the development request message comprises a specification of a target operating environment.

17. The non-transitory computer readable storage medium of claim 15, wherein the middleware development engine is hosted on a server.

18. The non-transitory computer readable storage medium of claim 15, wherein the virtual development environment comprises a set of validation options to validate operation of the target application build.

19. The non-transitory computer readable storage medium of claim 18, wherein the set of validation options comprises a set of test data sources.

20. The non-transitory computer readable storage medium of claim 18, wherein the processor further to generate an updated target application build using results of validation operations.

21. The non-transitory computer readable storage medium of claim 18, wherein the processor further to:

store the target application build to a client or to a storage associated with the middleware development engine; and debug the target application build using the testing and the validation results.

22. The method of claim 1, wherein the development request message is received from a client or from a network.

23. The system of claim 8, wherein the development request message is received from a client or from a network.

24. The non-transitory computer readable storage medium of claim 15, wherein the development request message is received from a client or from a network.

* * * * *